(12) United States Patent
McCleland et al.

(10) Patent No.: US 10,237,632 B2
(45) Date of Patent: *Mar. 19, 2019

(54) ASSOCIATION FUNCTIONALITY IN A MOBILE MONITORING DEVICE

(71) Applicants: Barry John McCleland, Southlake, TX (US); Eugene Christiaan van Beljon, Grapevine, TX (US)

(72) Inventors: Barry John McCleland, Southlake, TX (US); Eugene Christiaan van Beljon, Grapevine, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/823,094

(22) Filed: Nov. 27, 2017

(65) Prior Publication Data

US 2018/0084317 A1 Mar. 22, 2018

Related U.S. Application Data

(63) Continuation of application No. 15/447,961, filed on Mar. 2, 2017, now Pat. No. 9,832,547, which is a
(Continued)

(51) Int. Cl.
*G01S 5/00* (2006.01)
*H04Q 9/00* (2006.01)
(Continued)

(52) U.S. Cl.
CPC .............. *H04Q 9/00* (2013.01); *G01C 21/165* (2013.01); *G01C 25/005* (2013.01); *G01S 5/009* (2013.01);
(Continued)

(58) Field of Classification Search
CPC ....... H04Q 9/00; H04Q 2209/40; H04W 4/70; H04W 4/80; H04W 4/02; H04W 4/026;
(Continued)

(56) References Cited

U.S. PATENT DOCUMENTS 5,247,690 A * 9/1993 Fain .................... H04J 3/14
370/249
7,705,743 B2 * 4/2010 Barone ............... B61L 15/0027
340/682
(Continued)

OTHER PUBLICATIONS

Sensaware, http://www.senseaware.com/wp-content/uploads/SA2000_Sales_Slick.pdf, 2012, 2 pages.
(Continued)

*Primary Examiner* — Hai Phan
*Assistant Examiner* — Franklin D Balseca
(74) *Attorney, Agent, or Firm* — Ohlandt, Greeley, Ruggiero & Perle, L.L.P.

(57) ABSTRACT

A mobile monitoring device for continual remote monitoring of a condition is provided. The device includes a sensor module for producing sensor module data including inertial navigation data. A first transceiver component receives network manager data including inertial navigation data from a local network manager and may transmit sensor module data to the network manager for remote monitoring by a server. An associator component establishes an association with the local network manager if inertial navigation data of the sensor module and local network manager approximate each other and dissolves the association of the inertial navigation data of the sensor module and local network manager does not approximate each other. An inertial navigation component incrementally estimates a geographical location of the monitoring device using the previously received geographical location data and subsequent sensor module inertial navigation data.

20 Claims, 8 Drawing Sheets

Related U.S. Application Data continuation of application No. 14/632,347, filed on Feb. 26, 2015, now Pat. No. 9,628,876.

(51) Int. Cl.

| | | |
|---|---|---|
| *H04W 4/02* | (2018.01) | |
| *H04W 4/70* | (2018.01) | |
| *H04W 4/80* | (2018.01) | |
| *G01C 21/16* | (2006.01) | |
| *G01C 25/00* | (2006.01) | |
| *G01S 19/49* | (2010.01) | |
| *G01S 19/51* | (2010.01) | |
| *G06Q 10/08* | (2012.01) | |
| *H04W 84/12* | (2009.01) | |
| *H04W 84/18* | (2009.01) | |

(52) U.S. Cl.
CPC ............. *G01S 19/49* (2013.01); *G01S 19/51* (2013.01); *G06Q 10/08* (2013.01); *H04W 4/02* (2013.01); *H04W 4/026* (2013.01); *H04W 4/027* (2013.01); *H04W 4/70* (2018.02); *H04W 4/80* (2018.02); *H04Q 2209/40* (2013.01); *H04W 84/12* (2013.01); *H04W 84/18* (2013.01)

(58) Field of Classification Search
CPC ..... H04W 4/027; H04W 84/12; H04W 84/18; G01C 21/165; G01C 25/005; G01S 5/009; G01S 19/49; G01S 19/51; G06Q 10/08

See application file for complete search history.

(56) References Cited

U.S. PATENT DOCUMENTS

| | | | |
|---|---|---|---|
| 8,180,379 B2 | 5/2012 | Forstall | |
| 8,299,920 B2 | 10/2012 | Hamm et al. | |
| 8,957,812 B1 | 2/2015 | Hill et al. | |
| 9,084,075 B2 * | 7/2015 | Farley | H04L 67/12 |
| 9,443,365 B2 * | 9/2016 | Ahearn | G07C 9/00309 |
| 9,628,876 B2 * | 4/2017 | McCleland | H04W 4/70 |
| 9,832,547 B2 * | 11/2017 | McCleland | H04W 4/70 |
| 2003/0078042 A1 | 4/2003 | Miriyala | |
| 2007/0208841 A1 | 9/2007 | Barone et al. | |
| 2009/0005070 A1 | 1/2009 | Forstall | |
| 2009/0213785 A1 | 8/2009 | Hupp et al. | |
| 2009/0291664 A1 | 11/2009 | Sandberg | |
| 2011/0029229 A1 | 2/2011 | Hui | |
| 2012/0214506 A1 | 8/2012 | Skaaksrud | |
| 2012/0216252 A1 | 8/2012 | Skaaksrud | |
| 2012/0235791 A1 | 9/2012 | Donlan | |
| 2012/0262272 A1 | 10/2012 | Donlan | |
| 2012/0275361 A1 | 11/2012 | Berenberg | |
| 2013/0179074 A1 | 7/2013 | Haverinen | |
| 2013/0238269 A1 | 9/2013 | Sheng | |
| 2013/0258109 A1 | 10/2013 | Muraoka | |
| 2013/0344885 A1 | 12/2013 | Parisi | |
| 2014/0112200 A1 | 4/2014 | Lor | |
| 2014/0163870 A1 | 6/2014 | Riley | |
| 2014/0202229 A1 | 7/2014 | Stanley | |
| 2015/0032418 A1 | 1/2015 | Akiyama et al. | |
| 2016/0232791 A1 | 8/2016 | Tosa | |
| 2016/0354014 A1 * | 12/2016 | Lobner | A61B 5/0004 |

OTHER PUBLICATIONS

Moog Crossbow, ILC2000 Datasheet, 2011, 2 pages.
Frenzel, Lou; The Connected World Awaits, Electronic Design, pp. 28 to 36, Apr. 2014.
Raco Wireless, Enabling M2M Solutions With APIs, 6 pages.
Sensaware, Improving visibility and reaction time for critical aircraft parts, 2013, 2 pages.
International Search Report dated Jul. 1, 2016 from corresponding International Application No. PCT/IB2016/051046, 5 pages.

* cited by examiner

ASSOCIATION FUNCTIONALITY IN A MOBILE MONITORING DEVICE

CROSS-REFERENCE TO RELATED APPLICATIONS

This is a continuation of U.S. Pat. No. 9,832,547, which issued on Nov. 28, 2017 which is a continuation of U.S. Pat. No. 9,628,876, which issued on Apr. 18, 2017, the entire contents of which are incorporated herein by reference in their entireties.

FIELD OF THE DISCLOSURE

The disclosure relates to monitoring devices and systems and methods relating thereto. In particular, although not exclusively, the disclosure relates to monitoring devices for remotely monitoring conditions to which an object is exposed.

BACKGROUND TO THE DISCLOSURE

There are currently various solutions for monitoring, tracking and identifying machinery, equipment or objects. These solutions may be referred to as machine-to-machine (or M2M) applications and may include monitoring devices that monitor a condition and communicate sensor module data to a remote server computer.

For example, these monitoring devices that communicate sensor module data to a server computer may include one or more sensors with which an environmental condition such as ambient temperature, or barometric pressure, and a physical condition such as acceleration and vibration can be monitored. Such monitoring devices can make use of either wired or wireless communications.

Typically, wired devices are too limited and restrictive for M2M applications, especially where the equipment or object is not in a fixed location. Therefore stand-alone data loggers and wireless mobile monitoring devices may be more appropriate for M2M solutions.

There are currently several wireless solutions by which mobile monitoring devices can transmit sensor module data such as temperature and harsh handling data to a server computer. Some wireless solutions may use the industrial, scientific and medical (ISM) bandwidths. Exemplary solutions include active radio-frequency identification (RFID); Wi-Fi; Bluetooth™; Zigbee™; cellular networks; and other proprietary networks.

Whilst most of the wireless protocols mentioned above may be known, and may be successfully used for certain communication solutions, they alone may not provide sufficient capabilities that are desirable for very large mobile M2M solutions.

RFID and Bluetooth, for example, both typically have a short radio range which may limit the M2M network coverage area, and whilst Wi-Fi, Bluetooth™ and Zigbee™ may provide mesh network functionality and may use the license-free ISM band-width, they may not be suitably scalable, potentially providing only limited functionalities for very large M2M networks.

Furthermore, although cellular communication networks exist in many parts of the world, there is currently no convenient and/or cost effective method of permitting multiple M2M monitoring devices to move between various countries while communicating using cellular communication networks. This may either limit the use of monitoring devices to certain countries, or may dramatically increase the cost of deploying monitoring devices across various countries.

Furthermore, due to the relatively high power consumption associated with cellular communications, the battery life of these M2M monitoring devices may be limited. This can require that such monitoring devices be taken out of service in order for the batteries to be replaced or recharged.

The above-noted problems may become restrictive and can be significantly exasperated when thousands, or tens of thousands of M2M monitoring devices are deployed.

There is accordingly a need for a solution which alleviates these and/or other problems, at least to some extent.

SUMMARY

In accordance with the disclosure there is provided a mobile monitoring device for monitoring a condition to which an object is exposed as it moves between multiple wireless local area networks, each of which at least including one or more mobile or fixed network managers, wherein the monitoring device is configured to dynamically join a network with a network manager which is local to the monitoring device, the mobile monitoring device comprising: a sensor module for monitoring the condition and periodically producing sensor module data relating to the condition, wherein the sensor module data includes inertial navigation data; a first transceiver component for receiving network manager data from the local network manager; an associator component for comparing the network manager data with the sensor module data and, if the network manager data equals or approximates the sensor module data, establishing an association with the local network manager, during which association geographical location data of the local network manager is included in the network manager data and for, if the network manager data does not approximate the sensor module data and if an association with the local network manager is established, dissolving the association with the local network manager; and, an inertial navigation component for, responsive to the associator component dissolving the association, incrementally estimating a geographical location of the monitoring device using, as an initial set-point, the geographical location data of the local network manager received immediately prior to the association being dissolved and the subsequent inertial navigation data produced by the sensor module of the monitoring device.

Further features provide for the received network manager data further to include inertial navigation data of the local network manager, and for the associator component to compare at least part of the inertial navigation data produced by the sensor module with at least part of the inertial navigation data received from the local network manager.

Still further features provide for establishing the association to indicate that the monitoring device and local network manager have moved in unison and are on a common platform; for the monitoring device to be configured to remain in the network of the local associated network manager after dissolving the association whilst it is within wireless range; for the first transceiver component to be configured to receive network manager data from the local network manager via the network, for the first transceiver component to be further configured to transmit sensor module data to the local network manager via the network; for the monitoring device to be configured to transmit sensor module data to the local network manager after dissolving the association; for the monitoring device to include a power source and for the sensor module to be permanently activated for continual monitoring of the condition; and for the sensor module data to be accessible for remote monitoring by a server computer via the local network manager.

A yet further feature provides for the monitoring device to be a portable handheld monitoring device.

Further features provide for the inertial navigation data to include magnetometer, angular rate, gravitational and acceleration sensor data; for the sensor module data further to include one or more of the group of: vibration; temperature; barometric pressure, humidity, luminous intensity, and a measure of time; and for the network manager data further to include one or more of the group of: a data transmit permission indication; a network identifier; a network manager type; clock synchronization data; wireless frequency channel data, for withholding the data transmit permission indication to prevent the monitoring device from transmitting sensor module data.

Further features provide for the monitoring device to include a detecting component for detecting an event; for the event to be one or more of the group including: the sensor module data exceeding a corresponding condition threshold, receiving an instruction from the local network manager to transmit sensor module data to the local network manager, and a reporting frequency event; for the monitoring device to include a determining component for, if an event is detected and if the network manager data includes a data transmit permission indication, determining an optimal data path to the local network manager, for the optimal data path to be either via one or more other monitoring devices or directly between the monitoring device and local network manager; for the first transceiver component to transmit sensor module data to the local network manager via the optimal data path responsive to the detecting component detecting an event and if the network manager data includes a data transmit permission indication.

Yet further features provides for the monitoring device to further include a digital memory for storing one or more of the group of: network manager data; a configurable parameter; and sensor module data, and associator data; and for the configurable parameter to include one or more of the group of: a synchronisation parameter; a condition threshold; configuration data; and a reporting frequency.

Still further feature provide for the first transceiver component to use the received network manager data to establish a peer-to-peer network with the local network manager; and for the first transceiver component to include configuration parameters in each packet of data transmitted to the local network manager.

A further feature provides for the monitoring device to further include an encryption component for encrypting the sensor module data.

Yet further features provide for the monitoring device to further include a secondary radio frequency transceiver and a secondary transceiver component for receiving a request to transmit sensor module data from a secondary device via a short-range communication link provided by the second radio frequency transceiver and for, responsive to receiving the request, transmitting sensor module data to the secondary device via the short-range communication link.

Still further features provide for at least some of the data relating to a condition produced by the sensor module to be raw data; for the sensor data component to also be for receiving the raw data from the sensor module; for the monitoring device to further include a processing component for processing at least some of the received raw data and producing processed sensor module data; for the sensor module data to include processed sensor module data; and for the processed sensor module data to include one or more of the group of: direction, orientation, rotation, velocity, distance moved, distance dropped, force of impact, location and vibration.

The associator component may continually compare the network manager data with the sensor module data.

The first transceiver component may be configured to transmit sensor module data to the local network manager according to a specified reporting frequency.

Further features provide for the monitoring device to be configured to receive user input from a user via a short-range communication link or a keypad; for the monitoring device to be configured to output sensor module data to the user via the short-range communication link or a display screen; for the user input to include an instruction to output sensor module data; and for the sensor module data to be output to the user via the short-range communication link or the display screen in response to receiving the instruction.

The disclosure extends to a system for monitoring a condition to which an object is exposed, the system comprising a plurality of monitoring devices as described above, and a plurality of networks, wherein each one of the networks includes one or more network managers, each network manager including a first transceiver component for transmitting network manager data to the monitoring devices, and wherein each monitoring device is operable to dynamically join or establish a network with a network manager, being local to the monitoring device, as it moves from one local network to another.

The disclosure extends to a method for monitoring a condition to which an object is exposed, the method being conducted by a mobile monitoring device having a sensor module which monitors the condition and periodically produces sensor module data as the monitoring device moves between multiple wireless local area networks, each of which at least including one or more mobile or fixed network managers, wherein the monitoring device is configured to dynamically join a network with a network manager which is local to the monitoring device, the method comprising: receiving sensor module data from the sensor module, the sensor module data including inertial navigation data; receiving network manager data from the local network manager; comparing the network manager data with the sensor module data; if the network manager data equals or approximates the sensor module data, establishing an association with the local network manager, during which association geographical location data of the local network manager is included in the network manager data and, if the network manager data does not approximate the sensor module data and if an association with the local network manager is established, dissolving the association with the local network manager; and, responsive to dissolving the association, incrementally estimating a geographical location of the monitoring device using, as an initial set-point, the geographical location data of the local network manager received immediately prior to the association being dissolved and the subsequent inertial navigation data produced by the sensor module of the monitoring device.

Further features provide for the received network manager data further to include inertial navigation data of the local network manager, and for the step of comparing the network manager data with the sensor module data to compare at least part of the inertial navigation data produced by the sensor module with at least part of the inertial navigation data received from the local network manager.

Still further features provide for establishing the association to indicate that the monitoring device and local network manager have moved in unison and are on a common platform; for the monitoring device to remain in the network of the local network manager after dissolving the association; for the network manager data to be received from the local network manager via the network; for the method to include transmitting sensor module data to the local network manager via the network; and for the method to include transmitting sensor module data to the local network manager after dissolving the association.

Yet further features provide for the method to include determining from the inertial navigation data produced by the sensor module that the monitoring device is stationary and, responsive thereto, storing the estimated geographical location of the monitoring device.

Still further features provide for the method to include a step of detecting an event including one or more of the group of: the sensor module data exceeding a corresponding condition threshold, receiving an instruction from the local network manager to transmit sensor module data to the local network manager, and a reporting frequency event; and, if an event is detected and if the network manager data includes a data transmit permission indication, determining an optimal data path to a local network manager and transmitting sensor module data to the local network manager via the optimal data path.

In accordance with another aspect of the disclosure there is provided a system for monitoring a condition to which an object is exposed, comprising a mobile monitoring device, a local network manager local to the monitoring device and a remotely accessible server,
  wherein the monitoring device includes:
    a digital memory having at least one configurable parameter stored therein;
    a sensor module for monitoring the condition and periodically producing sensor module data relating to the condition; and,
    a microcontroller including:
      a sensor data component for receiving the sensor module data from the sensor module;
      a detecting component for detecting an event;
      a determining component for, if an event is detected, determining an optimal data path to the local network manager; and,
      a first transceiver component for transmitting sensor module data to the local network manager via the optimal data path;
  wherein the local network manager includes:
    a first transceiver component for receiving sensor module data from the monitoring device via the optimal data path; and,
    a communication component for transmitting received sensor module data to the server;
  and wherein the remotely accessible server includes:
    a communication component for receiving sensor module data from the local network manager.

Further features provide for the local network manager to further include a geographical location monitoring component for monitoring a geographical location of the local network manager; for the first transceiver component of the local network manager to be further configured for transmitting, to the monitoring device via an optimal data path, geographical location data of the local network manager; and for the geographical location monitoring component to be one or more of the group including: a global positioning system (GPS) receiver, a GLONASS receiver, or a global navigation satellite system (GNSS) receiver.

Yet further features provide for the remotely accessible server to include a configuration receiving component for receiving configuration data; for the configuration data to include updates to the at least one configurable parameter; and for the communication component of the remotely accessible server to be further configured for transmitting the configuration data to the monitoring device via the local network manager and the optimal data path.

Still further features provide for the first transceiver components of the monitoring device and local network manager to be low-power wireless radios which may be configured for low-rate wireless local area networking. The transceiver component may use the Institute of Electrical and Electronics Engineers (IEEE) 802.15.4 communication standard, and may operate with a carrier frequency within the 2.4 GHz Industrial Scientific and Medical (ISM) band.

The communication component of the local network manager and the remotely accessible server may provide a wired or wireless communication link.

In embodiments of the disclosure the system may include a plurality of monitoring devices configured to establish a peer-to-peer ad hoc network via which each one of the plurality of monitoring devices may communicate with the local network manager. Each one of the plurality of monitoring devices may be configured to dynamically join the peer-to-peer ad hoc network and the first transceiver component of each one of the plurality of monitoring devices may be configured for transmitting sensor module data to and receiving sensor module data from another monitoring device in the peer-to-peer ad hoc network. Each one of the plurality of monitoring devices in the peer-to-peer ad hoc network may in turn be configured to identify a data path to the local network manager, wherein a data path from one monitoring device to the network manager is either via one or more other monitoring devices or directly between the monitoring device and local network manager, and wherein an upstream monitoring device is a monitoring device from which a particular monitoring device receives sensor module data and a downstream monitoring device is a monitoring device to which a particular monitoring device transmits sensor module data.

Further features of embodiments of the system provide for the optimal data path to be one or more of the group including: a data path from a particular monitoring device to the local network manager which minimizes the number of other monitoring devices via which the sensor module data must be transmitted; an idle data path from a particular monitoring device to the local network manager; and a data path from a particular monitoring device to the local network manager which best utilizes signal strength of other monitoring devices via which the sensor module data must be transmitted.

Still further features provide for the system to include a plurality of local network managers, in which case the determining component of each of the plurality of monitoring devices may be further configured to determine an optimal data path to a local network manager being one or both of the closest local network manager or the closest active local network manager; for the sensor module data to include one or both of sensor module data of a particular monitoring device and sensor module data of one or more upstream devices; for each one of the plurality of local network managers to further include a backhaul transceiver, which may be a wireless radio configured for low-rate wireless local area networking; for the backhaul transceiver component to use the Institute of Electrical and Electronics Engineers (IEEE) 802.15.4 communication standard; for the backhaul transceiver component to operate with a carrier frequency of between 800 and 950 MHz; and for the system to further include one or more repeater devices, each of which may include: a first transceiver component for receiving sensor module data from the plurality of monitoring devices and a backhaul transceiver component for transmitting sensor module data to one of the plurality of local network managers.

Yet further features provide for the backhaul transceiver component of each one of the one or more repeater devices to be further configured to transmit sensor module data to one or more other repeater devices or one or more of the plurality of local network managers; for each one of the plurality of the local network managers to be located in either a fixed or a mobile location; for local network managers in fixed locations to be located in one or more of the group including: warehouses, manufacturing facilities, marshalling yards, sea-ports, airports and customs border posts; for the local network managers in mobile locations to be fitted in one or more of the group including: ships, trains, aircraft, delivery trucks, trailers, and intermodal containers.

Various embodiments will now be described with reference to the accompanying drawings.

DETAILED DESCRIPTION OF THE PREFERRED EMBODIMENTS

Mobile machine-to-machine (M2M) wireless monitoring devices that are capable of monitoring one or more conditions and which can form a peer-to-peer wireless sensor network (WSN) with other monitoring devices are described herein. The monitoring devices transmit sensor module data in a peer-to-peer ad hoc network to a network manager which is configured to forward the sensor module data to an Internet-based remotely accessible "Internet of Things" (IoT) platform, where the data is retrievable by selected users.

Figure 1A:
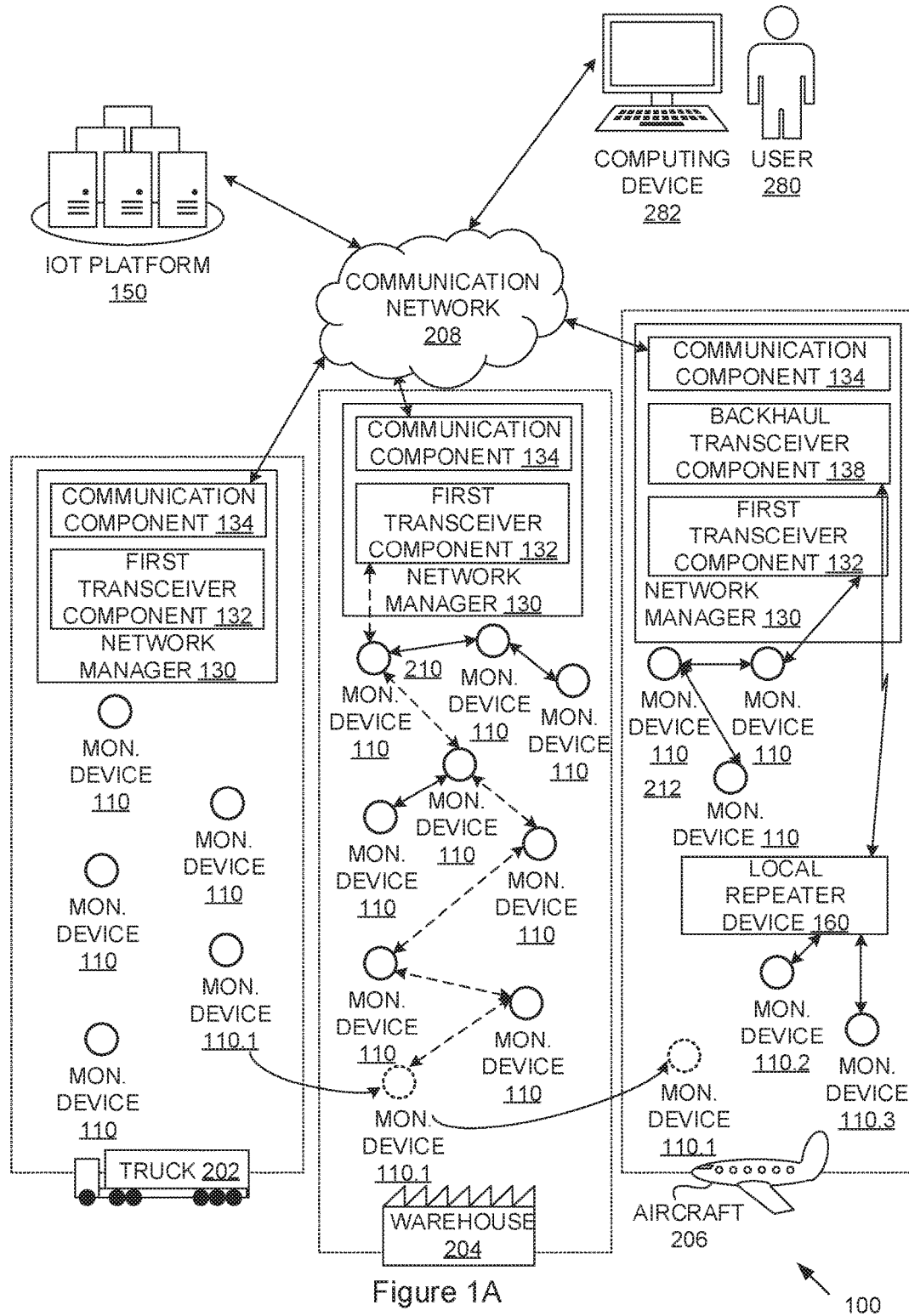
FIG. 1A is a schematic diagram which illustrates a system which includes a plurality of monitoring devices, a plurality of network managers, and a remotely accessible IoT platform.

FIG. 1A is a schematic diagram which illustrates an exemplary system (100) according to one embodiment. The system (100) includes a plurality of monitoring devices (110), a plurality of network managers (130) and a remotely accessible IoT platform (150).

Each monitoring device (110) is configured to monitor one or more conditions, for example, using a sensor module which produces sensor module data related to the one or more conditions. The conditions monitored are typically environmental or physical conditions associated with the environment in which the monitoring device (110) finds itself. The conditions may, for example, be rotation, gravity acceleration, vibration, temperature, barometric pressure, humidity, magnetic field, luminous intensity, and a measure of time.

Each monitoring device (110) is configured to transmit sensor module data to a network manager (130) and is uniquely identifiable by a 64-bit identification number. In some embodiments, the identification number may be graphically rendered as a barcode which may be displayed on a display screen of the monitoring device (110). As such, the monitoring device may be configured to monitor, record, transmit and display the environmental and physical status of an object with which it is associated.

The monitoring devices (110) are attached to, embedded in, or fastened to or otherwise closely associated with objects. Exemplary objects include, amongst others, containers, pallets, boxes, etc. for the transportation of goods, cold supply chain goods, fast moving consumer goods and the like; goods such as pharmaceuticals, fruit, flowers, frozen foods, transplant organs, hazardous materials, passenger baggage, confidential documents, valuable artifacts such as paintings or other sensitive artworks, jewelry, products and the like; vending machines; earth moving equipment; military equipment; smart meters for electricity, water and gas supplies; air-conditioning systems; pipelines; intermodal containers on ships or at custom border posts, and the like.

In the embodiment illustrated in FIG. 1A, each one of the network managers (130) is associated with a truck (202), a warehouse (204) and an aircraft (206) respectively. For example, a mobile network manager (130) may be fitted in a cargo area or container of the truck (202) and receive electrical power from an electrical power system of the truck (202), or from the built-in battery of the network manager. Similarly, one or more fixed network managers (130) may be fitted in a warehouse (204), receiving electrical power from electrical power systems of the warehouse (204), or a back-up battery of the manager. Embodiments anticipate fixed network managers (130) being installed in warehouses, receiving or shipping docks, marshalling yards, manufacturing plants, border control posts and oil rigs to name but a few. Similarly, embodiments provide for mobile network managers to be secured to or inside moving equipment such as rail road cars, transport trailers, delivery trucks, ships, aircraft, intermodal containers and the like.

Each network manager (130) is in communication with the IoT platform (150) via a communication component (134) and the communication network (208). The communication network (208) may be any appropriate communication network including, for example, the Internet, a virtual private network (VPN), a personal area network (PAN), a local area network (LAN), a wireless LAN (WLAN), a cellular communication network, a satellite communication network, Wi-Fi, Ethernet, USB or the like.

The monitoring devices (110) are configured to establish a peer-to-peer ad hoc network among themselves via which each one of the plurality of monitoring devices (110) may communicate with a network manager (130). A peer-to-peer ad hoc network (210) established between monitoring devices in the warehouse (204) is illustrated in FIG. 1A. The monitoring devices (110) in the warehouse (204) may communicate with the fixed network manager (130) of the warehouse (204) via the peer-to-peer ad hoc network (210). Similar peer-to-peer ad hoc networks are established by the monitoring devices (110) in the truck (202) and the aircraft (206) respectively via which the monitoring devices may communicate with the mobile network managers. In some embodiments, a peer-to-peer ad hoc network may only be established by a monitoring device (110) in response to the monitoring device detecting that an event has occurred.

Each one of the plurality of monitoring devices (110) is configured to dynamically join a peer-to-peer ad hoc network (e.g. 210). For example, as goods to which a monitoring device (e.g. 110.1) is attached are unloaded from the truck (202) into the warehouse (204), the monitoring device (110.1) attached to those goods is configured to dynamically join the peer-to-peer ad hoc network (210) established between the monitoring devices (110) in the warehouse (204) such that the monitoring device (110.1) is able to communicate with the IoT platform (150) via the fixed network manager (130) of the warehouse (204).

The goods to which the monitoring device (e.g. 110.1) is attached may then be loaded from the warehouse (204) into the aircraft (206) and may thus dynamically join a peer-to-peer ad hoc network (212) established between the monitoring devices (110) in the aircraft (206) such that the monitoring device (110.1) is able to communicate with the IoT platform (150) via the mobile network manager (130) of the aircraft (206). In some cases, the local network manager may prohibit monitoring devices from transmitting sensor module data, for example by withholding a permission to transmit indication when the monitoring devices are in an aircraft. This may ensure compliance with relevant aviation rules prohibiting the use of certain transmitters during flight, and so on.

Accordingly, each monitoring device (110) is provided with a first transceiver component for transmitting sensor module data to and receiving sensor module data from other monitoring devices in the peer-to-peer ad hoc network (210). Each one of the plurality of monitoring devices (110) in the peer-to-peer ad hoc network (210) is configured to identify a data path to a network manager (130) which may be via one or more other monitoring devices (110), or directly from the monitoring device (110) to the network manager (130).

An upstream monitoring device is defined as a monitoring device from which a particular monitoring device receives sensor module data while a downstream monitoring device is defined as a monitoring device to which a particular monitoring device transmits sensor module data. As such, sensor module data transmitted from a monitoring device (110) includes one or both of: sensor module data of that particular monitoring device and sensor module data of one or more upstream devices.

FIG. 1A illustrates an optimal data path (dashed line) which is determined by a determining component of a particular monitoring device (110.1) in the warehouse (204). What exactly constitutes an optimal data path may be determined by a variety of factors including relative position and orientation of a monitoring device to other monitoring devices or a local network manager, residual power of a monitoring device and operational requirements of the overall system to name but a few. The optimal data path may also be a data path from the particular monitoring device (110.1) to the network manager (130) which minimizes the number of other monitoring devices (110) via which the sensor module data must be transmitted, an idle data path from the particular monitoring device (110.1) to a network manager (130) or a data path from the particular monitoring device (110.1) to the network manager (130) which best utilizes signal strength of other monitoring devices (110) via which the sensor module data must be transmitted, to name but three. While only the optimal data path of one monitoring device (110.1) is illustrated, it should be noted that each one of the plurality of monitoring devices (110) is configured to determine its own optimal data path to the network manager (130).

In the embodiment illustrated in FIG. 1A, the aircraft (206) includes a local repeater device (160). The local repeater device (160) is configured to receive sensor module data from monitoring devices (e.g. 110.2, 110.3) which are isolated from both the network manager (130) of the aircraft (206) and the peer-to-peer ad hoc network (212) established between the other monitoring devices (110) in the aircraft and the network manager (130). The local repeater device (160) is further configured to transmit the received sensor module data to the mobile network manager (130) of the aircraft (206). In the illustrated embodiment, the local repeater device (160) transmits the sensor module data to the mobile network manager (130) of the aircraft (206) using the backhaul transceiver components (138) of the local repeater device (160) and mobile network manager (130) respectively. The backhaul transceiver component may enable the local repeater device (160) to communicate with the mobile network manager over a longer range.

The sensor module data is transmitted to the IoT platform (150) via the network managers (130) and the communication network (208). Once received and compiled at the IoT platform, a user (280) may then use a computing device (282) to view the sensor module data or a selected subset of the sensor module data that is stored on the IoT platform (150).

The IoT platform (150) may be any appropriate server computer platform and its functions are to, amongst others, configure parameters and sensor threshold limits for monitoring devices (110), to receive sensor module data from monitoring devices (110) via network managers (130), and to provide information, reports of conformity and shipping details to a user (280). During the transit process of an object that is associated with a monitoring device (e.g. 110.1), should an event be detected (such as a condition threshold being exceeded), the monitoring device (110.1) transmits an alert message via the network manager (130) to the IoT platform (150), after which a short messaging service (SMS) message, email or other appropriate message may be transmitted to a user (280).

Although the monitoring devices (110) may be configured to monitor and record all sensor data continuously or periodically, all sensor module data may be unnecessary until an event is detected. An event can be any one or more of a number of environmental or physical conditions, but for the sake of this example it may include the monitored condition exceeding a threshold set for the condition, receiving an instruction from the local network manager to transmit sensor module data to the local network manager, receiving an instruction from the remotely accessible IoT platform to transmit sensor module data to the remotely accessible IoT platform or a combination or variations of these.

In an attempt to extend the battery life of the monitoring device (110), the user (280) may specify a reporting frequency (without exception alerts), such as 10 minutes, 30 minutes, hourly, 6 hourly or the like, whereby the monitoring device transmits the sensor module data to the network manager at these specified times. However, sensor module data may continue to be logged on the device and may not be dependent on the reporting interval. At any time during a shipment process, or once the transit of the object is completed, the user (280) is able to access selected data for audit purposes and print a certificate of conformity in accordance to the specified recording intervals. However, should the user (280) observe any discrepancy that occurred during transit of the item, the user (280) will be able to retrieve all the detailed sensor module data on, for example, a second-by-second basis from the monitoring device (110) via the IoT platform (150), provided the monitoring device (110) is within range of a network manager (130).

The user (280) may be any user of the system (100). In some embodiments, the user (280) may include different users acting in different capacities. For example and where applicable, users may include customs border officials, persons receiving the object, persons responsible for the upkeep of the object, persons transporting the object, persons maintaining or operating the system (100) and the like. Different users may be able to perform different functions and view different data according to capacities in which they act.

By providing a plurality of network managers (130) at various points along an object's transit route, the described systems and devices provide a monitoring device (110) which can continuously or periodically monitor a condition to produce sensor module data which can then be transmitted to the IoT platform (150) via an appropriate network manager (130).

As the monitoring devices (110) communicate with the IoT platform (150) via network managers (130), the use of expensive communication links such as cellular or satellite communication links may be kept to a minimum. In cases where the network managers are fixed in location, the local network managers may be able to communicate with the IoT platform via, for example the Internet. Alternatively, mobile network managers such as those which are provided in the aircraft (206) or the truck (204) may require use of wide area network (WAN) connections such as Wi-Fi, cellular or satellite communication links. However, when a plurality of monitoring devices (110) communicate through a single mobile network manager, the expense of cellular or satellite communication links in these instances may be reduced because the data from many monitoring devices may be batched into a single cellular transmission. Naturally the monitoring information received by the network managers (130) from the monitoring devices (110) may be batched and transmitted to the IoT platform (150) together. This may alleviate additional costs associated with the establishment of communication sessions between the network managers (130) and IoT platform (150).

Furthermore, the monitoring devices may have to operate in various different countries as they travel from their source to their destination. As cellular communication network standards may vary from one country to the next, providing a monitoring device which is able to communicate over a cellular communication link in a plurality of different countries may be a difficult and costly exercise. By providing fixed network managers in different countries via which the monitoring devices communicate with the IoT platform, these complications and costs may be alleviated.

The system described herein thus enables a plurality of monitoring devices to move between, and associate with or join, multiple local networks, without human intervention, as they move from one location to the next. Each local network can include multiple repeaters and multiple mobile or fixed network managers and can be situated at any geographical location in the world. The local networks may enable the monitoring devices to communicate with the IoT platform or other appropriate server computers, while avoiding incurring high data charges often associated with roaming telecommunications. The local networks may be maintained by a single entity or associated group of entities.

Figure 1B:
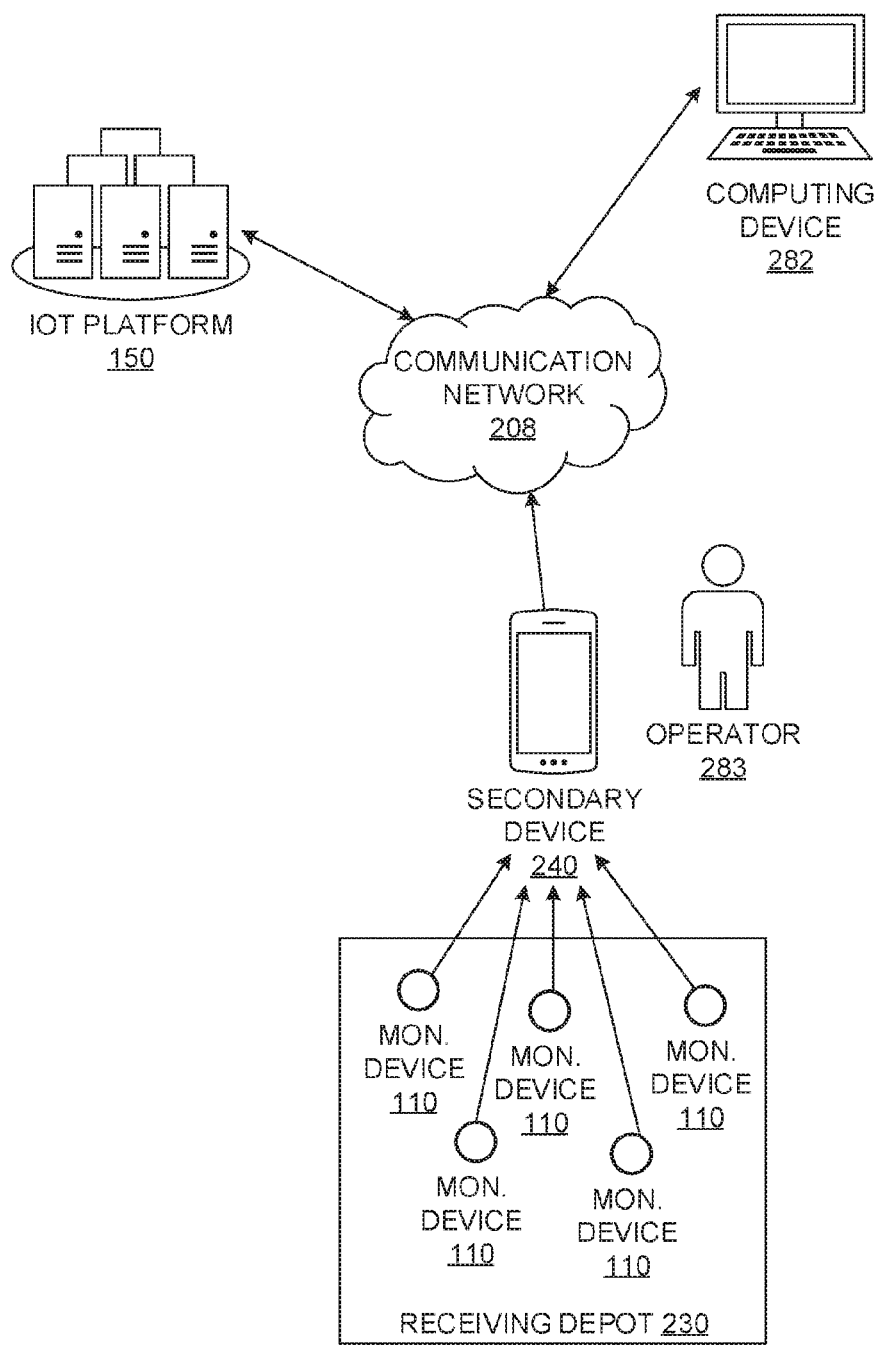
FIG. 1B is a schematic diagram which illustrates an exemplary system which includes a secondary device and a number of monitoring devices.

The mobile monitoring devices as described herein are further configured to communicate with a secondary device via a secondary transceiver component with a short-range wireless communication link. FIG. 1B is a schematic diagram which illustrates an exemplary system (101) which includes a secondary device and a number of monitoring devices (110). The monitoring devices (110) may be in a receiving depot (230), for example, having been received from truck or an aircraft.

The secondary device (240) may be a smart phone, tablet computer or other appropriate electronic device capable of communicating with the monitoring devices (110) over the short-range communication link and also with the remotely accessible IoT platform (150). The short-range communication link in this exemplary scenario is a Bluetooth™ communication link.

An operator (283) of the secondary device (240) may use the secondary device (240) to request sensor module data from one or more of the monitoring devices. The request is transmitted over the Bluetooth™ communication link. Responsive to receiving the request, the monitoring devices (110) transmit sensor module data to the secondary device (240) via the communication link. In this embodiment, the sensor module data is transmitted to the secondary device (240) in a star meshed network. The secondary device (240) may then transmit the received sensor module data to the remotely accessible IoT platform (150) via the communication network (208), from where it can be accessed by other users.

Figure 2:
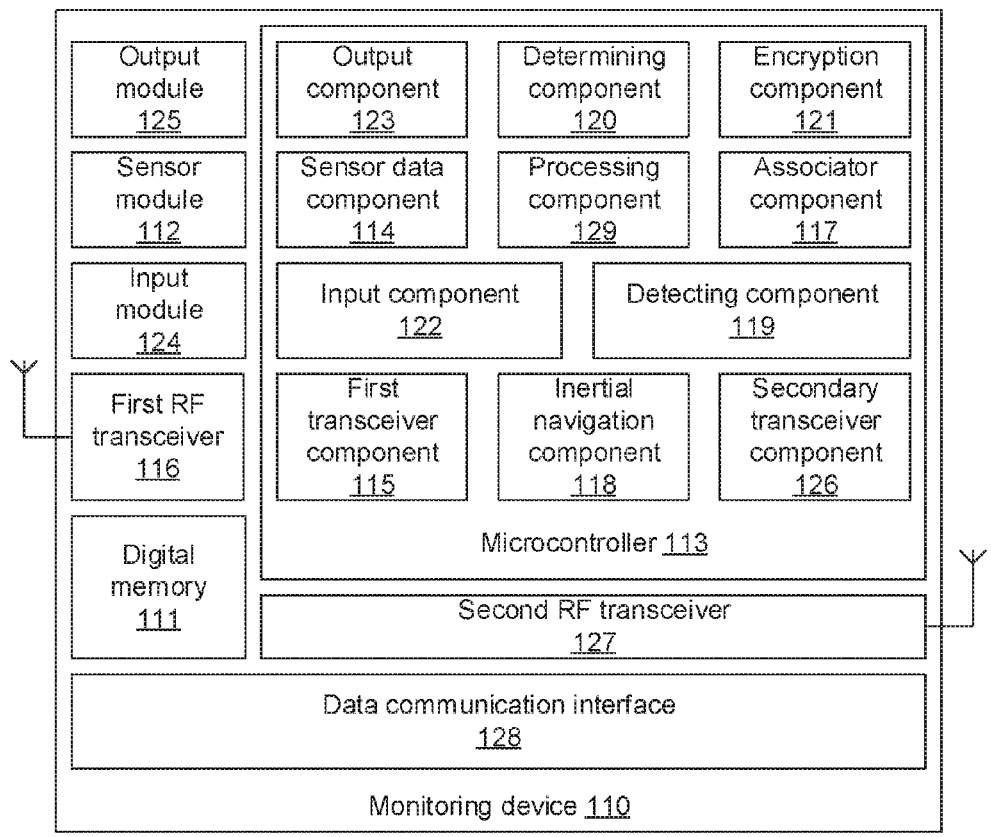
FIG. 2 is a block diagram which illustrates an exemplary system according to embodiments of the disclosure.
Figure 2:
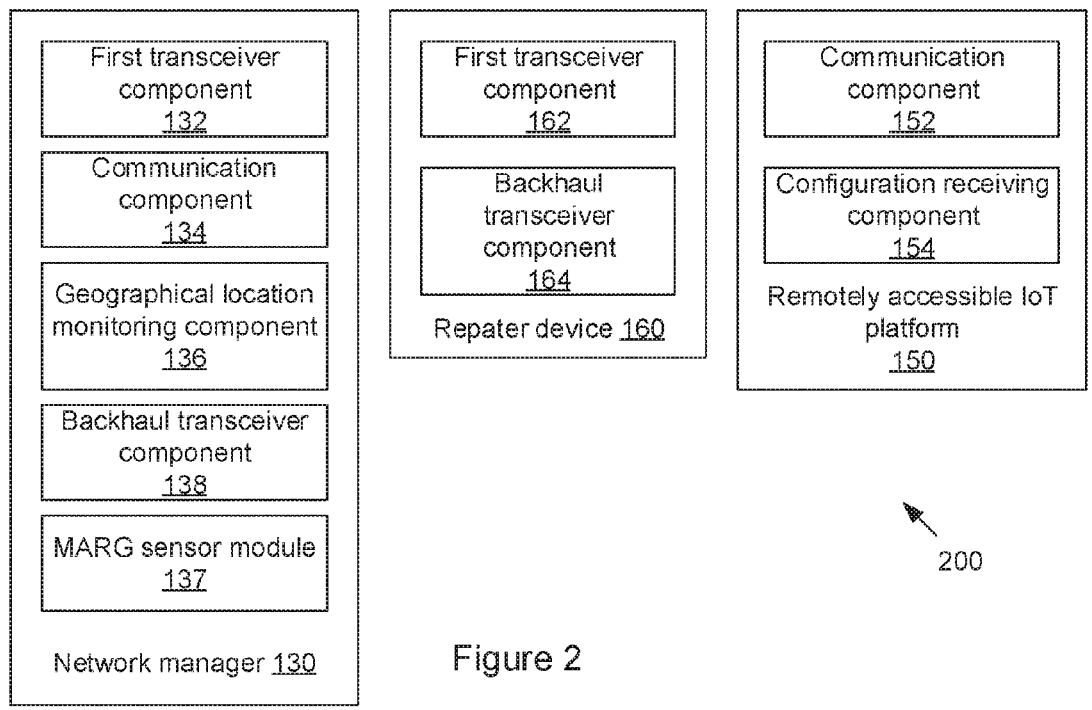

FIG. 2 is a block diagram which illustrates exemplary devices of a system (200), such as that described above with reference to FIG. 1A or 1B. The system (200) includes a mobile monitoring device (110), a network manager (130), a remotely accessible IoT platform (150) and a local repeater device (160).

The monitoring device (110) may include a digital memory (111) for storing device data. The device data may include one or more of the group of: a synchronisation parameter, a condition threshold, configuration data, a reporting frequency and sensor module data. The digital memory may also store network manager data received from a local network manager.

The condition threshold may include one or more of: a maximum permissible acceleration of the product, a minimum and/or maximum temperature to which the product may be exposed, a minimum and/or maximum barometric pressure to which the product may be exposed, a minimum and/or maximum humidity to which the product may be exposed, a minimum and maximum luminous intensity to which the product may be exposed, a time interval and the like.

The synchronisation parameter may include a network identifier, date and time references of the local network manager, local geographical references which may be time stamped acceleration and magnetometer altitude and heading reference system (AHRS) data and the like.

The configuration data of the monitoring device may include local network forming data, which may include identifiers of available network managers that the monitoring device is capable of communicating with and usable in establishing a local area network (LAN) with the relevant local network manager. The configuration data may also include a table of neighbouring monitoring devices that may be used to form peer-to-peer links with other devices to communicate sensor module data and network messages.

The monitoring device (110) may further include a sensor module (112) which monitors a condition to which the object is exposed and produces or outputs sensor module data relating to the condition. The sensor module (112) may include one or more of: an angular rate sensor such as a gyroscope; an accelerometer; a gravitational sensor; a temperature sensor; a barometer; a humidity sensor; a magnetometer; a digital luminosity sensor; a clock; and the like. Accordingly, the sensor module may monitor conditions including one or more of: rotation, acceleration, vibration, temperature, barometric pressure, humidity, magnetic field, luminous intensity, and a measure of time to which the product associated with the sensor module (112) is exposed. The sensor module data output by the sensor module (112) may therefore include actual measurements and/or estimates of a condition. In some cases, the data produced by the sensor module (112) is raw data which requires processing.

The monitoring device (110) may also include a microcontroller (113). The term "microcontroller" as used herein should be interpreted broadly and is intended to include any suitable arrangement of circuitry including a processor, microprocessor, a field programmable gate array (FPGA), an application specific integrated circuit (ASIC) or the like. The various components of the microcontroller (113) may be implemented as software, firmware or, where applicable, as hardware as well as a combination of these.

The microcontroller (113) may provide a sensor data component (114) for receiving sensor module data from the sensor module (112). For instances where the data received from the sensor module is raw data, the microcontroller (113) may also provide a processing component (129) for processing the received raw data and producing processed sensor module data. For the purposes of this description, "sensor module data" includes processed sensor module data. The sensor module data may include one or more of the group of: direction, orientation, rotation, velocity, distance moved, distance dropped, force of impact, location and vibration, and the like thereof.

A specific portion of sensor module data, referred to as "MARG data", may include data received from a magnetometer, an angular rate sensor, and a gravitational sensor. In some embodiments, the MARG sensor data includes data received from a barometric pressure sensor. MARG sensor data is sensor data which may be used by the monitoring device for tracking its location using inertial navigation techniques.

The microcontroller (113) may also provide a first transceiver component (115) for receiving network manager data from the local network manager (130). The network manager data may include one or more of the group of: a data transmit permission indication; a network identifier; a network manager type; clock synchronization data; wireless frequency channel data; and geographical location data of the local network manager. The network manager data may further include MARG data of the local network manager (130).

The first transceiver component (115) may be configured to use the received network manager data and/or device data to establish a peer-to-peer network with the local network manager (130). The first transceiver component (115) may include its own configuration parameters in each packet of data transmitted to the network manager (130).

The first transceiver component (115) may further be for, responsive to receiving a data transmit permission indication and responsive to a detecting component detecting an event, transmitting sensor module data to the local network manager (130). Embodiments provide for the first transceiver component to transmit sensor module data for onward communication to the remotely accessible IoT platform without human intervention. The first transceiver component may also be for, without human intervention, uploading: software code; network configuration parameters; and user configurations and thresholds, via an optimal data path from a network manager.

The monitoring device (110) may include a first radio frequency (RF) transceiver (116) via which the first transceiver component (115) transmits and receives data. The first transceiver component (115) and first RF transceiver (116) may provide a low-power wireless radio configured for low-rate wireless local area networking and may make use the Institute of Electrical and Electronics Engineers (IEEE) 802.15.4 communication standard. The carrier frequency utilized by the first transceiver component (115) and first RF transceiver (116) is within the 2.4 to 2.5 GHz Industrial Scientific and Medical (ISM) band. The first transceiver component (115) and first RF transceiver (116) may further utilise a Myconi™ network layer for the peer-to-peer ad hoc wireless communication.

An advantage of using the IEEE 802.15.4 communication standard is that it is an internationally recognized communication standard which is typically licence-free throughout the world. Therefore, the monitoring devices as described herein are able to function worldwide and with reduced or at best no communication-related licence fees.

The microcontroller (113) may also provide an associator component (117) for comparing the network manager data with the sensor module data and, if the network manager data approximates the sensor module data, establishing an association with the local network manager (130). In particular, the associator component (117) may compare MARG data of the monitoring device to MARG data of the local network manager (130). Thus, the associator component (117) may be able to establish whether or not the monitoring device (110) is moving in unison with the local network manager (130), for example, in an aircraft, truck or the like. The associator component (117) may further be for dissolving the association with the local network manager if the network manager data no longer approximates the sensor module data.

In the embodiments described herein, instead of only using MARG sensor data to establish an association with a local network manager and incrementally estimate a geographical location of the monitoring device, "inertial navigation data" may be used. Inertial navigation data includes magnetometer, angular rate, gravitational (MARG) and acceleration sensor data.

The microcontroller (113) may further include an inertial navigation component (118) for, responsive to the associator component (117) dissolving the association, incrementally estimating a geographical location of the monitoring device (110) using geographical location data received from the local network manager (130) prior to the dissolving of the association and MARG sensor module data from the magnetometer, angular rate sensor and gravitational sensor.

The microcontroller (113) may include a detecting component (119) for detecting an event. The event may be one or more of the group including: the sensor module data exceeding a corresponding condition threshold, receiving an instruction from the local network manager to transmit sensor module data to the local network manager, a reporting frequency event, and the like.

The microcontroller (113) may also include a determining component (120) for, if an event is detected by the detecting component (119), determining an optimal data path to the local network manager (130) via which data may be sent and received. In some cases, the optimal data path may be via one or more other monitoring devices or alternatively directly between the monitoring device and local network manager.

Some embodiments provide for the microcontroller (113) to further include an encryption component (121) for encrypting device data and/or sensor module data.

It is also anticipated that the microcontroller (113) may further include an input component (122) for receiving input from a user and an output component (123) for outputting data to the user. The input component (122) may receive user input via an input module (124) provided on the monitoring device (110). Exemplary input modules include a keypad, one or more push buttons, a microphone and the like. The output component (123) may output data to the user via an output module (125) provided on the monitoring device. Exemplary output modules include a display screen, a speaker, a buzzer and the like. The input received from the user may be an instruction to display sensor module data. In response to receiving the instruction, the output component (123) may be configured to prompt the user to connect the monitoring device to an external power source prior to outputting sensor module data on the output module (125). This may ensure that the monitoring device does not use unnecessary energy while in the field but can instead use periods of manual interrogation by a user to at least partially recharge its power source.

The microcontroller (113) may also include a secondary transceiver component (126) which interfaces with a second RF transceiver (127) provided with the monitoring device (110). The secondary transceiver component (126) is for transmitting sensor module data to a secondary device via a short-range wireless communication link provided by the second RF transceiver. In some embodiments, the secondary transceiver component (126) and second RF transceiver (127) may provide a Bluetooth communication link between a secondary device and the monitoring device over which sensor module data may be transmitted. In other embodiments, the short-range communication link may be a near-field communication link or the like.

The monitoring device (110) may further include a data communication interface (128) for connecting via a data port one or more of the group of: a universal serial bus (USB) cable from an external device such as a personal computer (PC) to manually download the sensor module data; connecting one or more inter-integrated circuit (I2C) sensor probes providing additional sensors; connecting an RS-232 cable to an external device such as a PC or Wi-Fi router to enable mini-network manager functionality; connecting a power source for recharging the battery; providing a power outlet for powering 120 sensor probes. The data communication interface (128) is described in greater detail later in this specification.

As the systems described generally include a plurality of monitoring devices (110) which will at any given time be in proximity to at least one network manager (130), the ability of the monitoring device (110) to determine its position from information provided by the network manager (130) and MARG sensor data alleviates the need for it to be provided with its own global positioning system (GPS) or similar receiver. This may result in significant savings in both the energy requirements of the monitoring device but also its cost of manufacture, as it will not have to have its own positional hardware or software.

In some embodiments, the monitoring device may further include a communication component and a geographical position monitoring component, although as described above, this may not be desirable.

As mentioned above, in some embodiments the described system includes a plurality of monitoring devices (110) which are configured to establish a peer-to-peer ad hoc network via which each monitoring device may communicate with the network manager (130). The network manager (130) may in turn use Ethernet, USB or Wi-Fi to forward the gathered sensor module data to the IoT platform (150). However, in remote situations where there is no Ethernet or Wi-Fi, or if the network manager (130) is affixed to a mobile unit such as an aircraft, railcar or delivery vehicle, the network manager (130) may use either cellular or satellite communication to transmit the sensor module data to the IoT platform (150).

Typically, the network manager (130) receives electrical power from an external power source and may have a battery for back-up purposes. In some embodiments, the network manager (130) itself includes a sensor module for monitoring a condition and producing sensor module data.

The network manager (130) may be configured to manage the peer-to-peer ad hoc network and to synchronize with monitoring devices (110) within the network as to when the monitoring devices (110) should form peer-to-peer networks and when the monitoring devices should transmit sensor module data. In some cases the network manager may even include functionality enabling it to assist monitoring devices in deciding how to form the peer-to-peer networks and, in some cases, even how to calculate the optimal route for data transmission. The network manager (130) may also receive the sensor module data, which may be encrypted, from each monitoring device in the network and forwards the encrypted packets of data to the IoT platform (150).

The network manager (130) includes a first transceiver component (132) for receiving sensor module data from the monitoring devices (110) via the optimal data path or from a local repeater device (160) via the backhaul transceiver component. The network manager (130) also includes a communication component (134) for transmitting received sensor module data to the remotely accessible IoT platform (150).

The first transceiver component (132) of the local network manager (130) also transmits network manager data, including, for example, the MARG sensor data, the geographical location data of the network manager (130) and network synchronization and configuration parameters to the monitoring device (110). The local network manager may further be configured to control transmissions from the monitoring device. The local network manager may include a data transmit permission indication in the network manager data transmitted to the monitoring device in order to grant permission to the monitoring device to transmit sensor module data. Withholding the data transmit permission indication may prevent the monitoring device from transmitting sensor module data, even if an event is detected. This is advantageous in scenarios where monitoring devices are located in, for example, aircraft, where radio frequency transmissions are prohibited at certain points.

The first transceiver component (132) of the network manager (130) is similar to that of the monitoring device (110) and, in the illustrated embodiment, may utilise a wireless radio configured for low-rate wireless local area networking which makes use of the IEEE 802.15.4 communication standard. The carrier frequency utilized by the first transceiver component (132) is typically within the 2.4 to 2.5 GHz ISM band.

The network manager (130) further includes a geographical location monitoring, or positioning component (136) for monitoring or determining a geographical location of the network manager (130). It will be appreciated that the geographical locational monitoring component (136) could include any one or more of a global positioning system (GPS) receiver, a GLONASS receiver, or a global navigation satellite system (GNSS) receiver. In some embodiments, for example where the network manager (130) has a fixed location, the geographical locational monitoring component (136) may retrieve a stored geographical coordinate of the network manager from a digital memory or database.

The network manager (130) may also include a MARG sensor module (137) for producing MARG sensor data relating to the network manager (130). The MARG sensor module (137) may at least include a magnetometer, an angular rate sensor and a gravitational sensor and the MARG sensor data may be included in network manager data transmitted to the monitoring device (110).

The network manager (130) may further include a backhaul transceiver component (138) which may utilise a wireless radio configured for low-rate wireless local area networking making use of the Institute of IEEE 802.15.4 communication standard. The backhaul communication component (138), however, operates with carrier frequencies of 868 MHz, 950 to 956 MHz, and 962 to 968 MHz and is for communicating with local repeater devices (160).

In some embodiments of the disclosure, more than one network manager (130) may be included in a peer-to-peer network. This may provide for redundancy in case one local network manager fails, and it also enables for a greater volume of monitored data to pass through the network in the shortest period of time.

The IoT platform (150) includes a communication component (152) for receiving sensor module data from one or more networks via network managers (130) and a configuration receiving component (154) for receiving configuration data. The configuration data may include updates to the at least one configurable parameter. The communication component (152) of the IoT platform (150) is accordingly also for transmitting the configuration data to the monitoring devices (110) via the network manager (130) and the optimal data path.

The communication components (134, 152) of the network manager (130) and the IoT platform (150) may provide any appropriate wired or wireless communication link. Exemplary wireless or wired communication links include Wi-Fi, USB, Ethernet, cellular such as (global system for mobile communications) GSM, long term evolution (LTE), 3G and the like, as well as a satellite communication link.

The local repeater device (160) includes a first transceiver component (162) for receiving sensor module data from, and transmitting sensor module data to, the plurality of monitoring devices (110), and the network managers (130) and, in some embodiments, one or more other local repeater devices. The local repeater device (160) also includes a backhaul transceiver component (164) for transmitting sensor module data to one or both of the network manager (130) or another local repeater device. The backhaul transceiver component (164) is similar to the backhaul transceiver component (138) of the network manager.

Figure 3A:
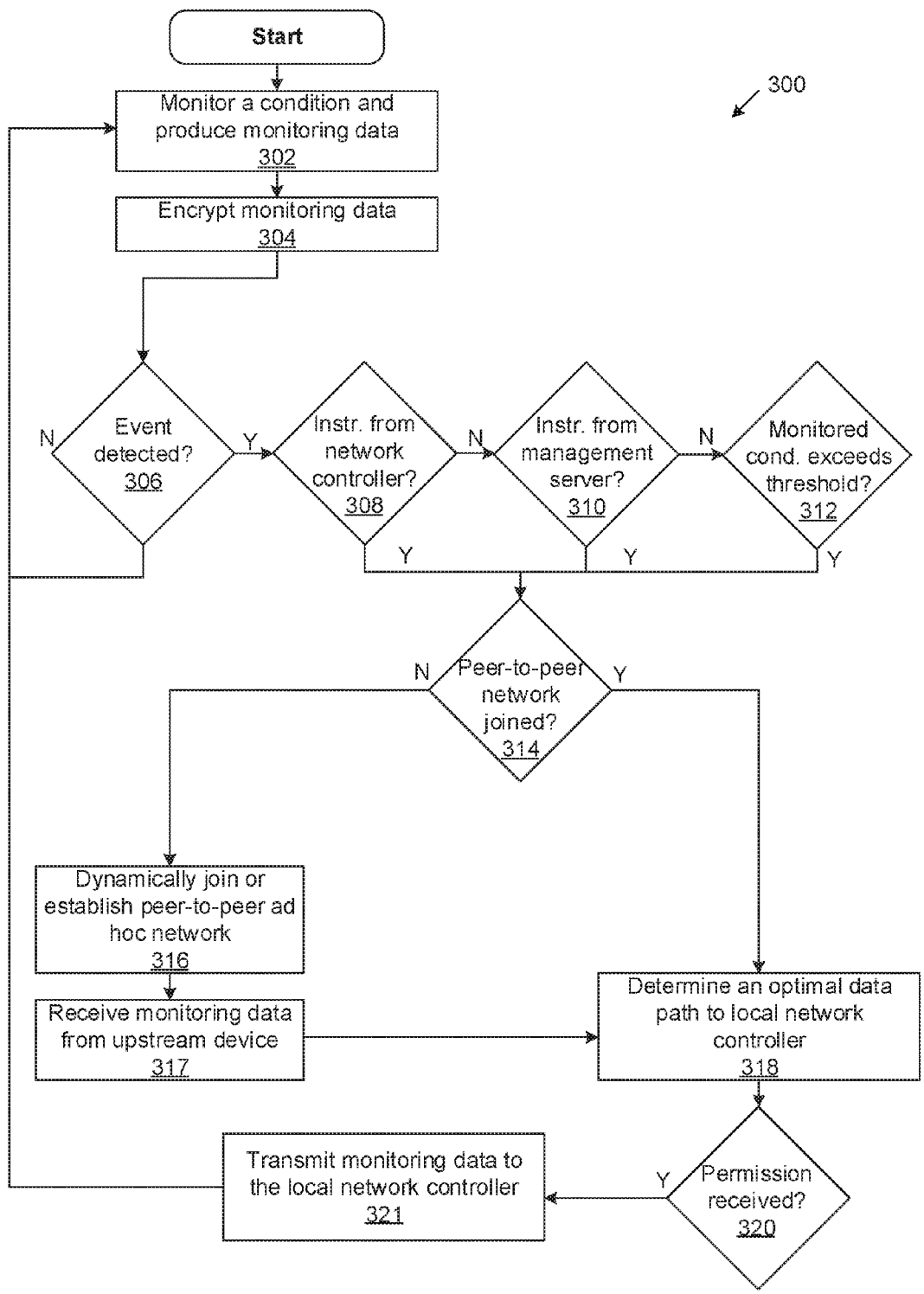
FIG. 3A is a flow diagram which illustrates an exemplary method according to embodiments of the disclosure.
Figure 3B:
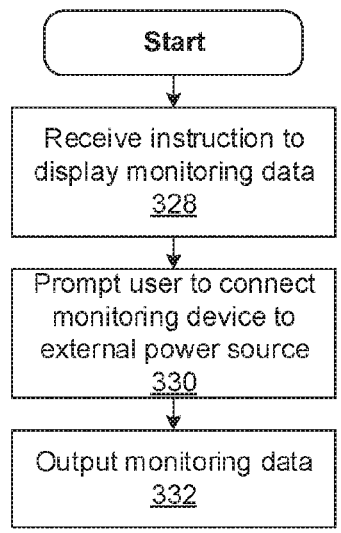
FIG. 3B is a flow diagram which illustrates additional steps of the method illustrated in FIG. 3A.
Figure 3C:
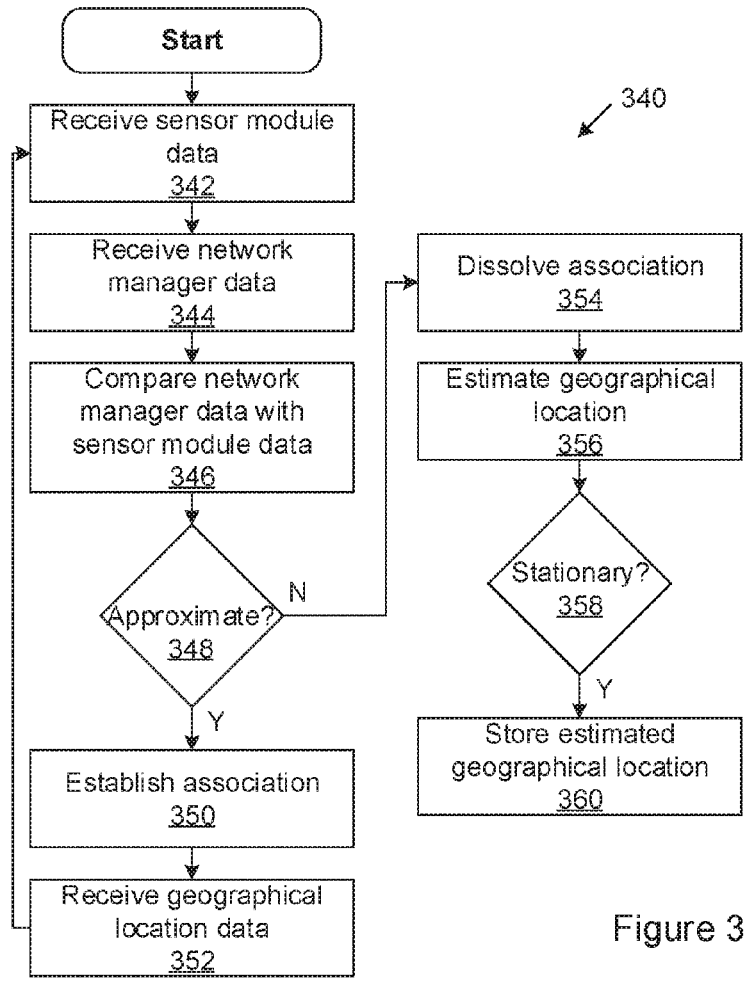
FIG. 3C is a flow diagram which illustrates another exemplary method conducted at a monitoring device.

FIGS. 3A to 3C are flow diagrams which illustrate exemplary methods which may be performed by a monitoring device as described herein. In operation, the monitoring device is typically secured to or closely associated with an object or product in transit.

Firstly regarding FIG. 3A, at an initial stage (302), the monitoring device periodically monitors a condition and produces sensor module data. As mentioned above, the condition monitored may be rotation, acceleration, temperature, barometric pressure, humidity, magnetic field, luminous intensity, and a measure of time amongst others. The sensor module data produced may include measurements or estimates of the condition output by a sensor module of the monitoring device. In some embodiments, the monitoring device may encrypt the sensor module data at a next stage (304).

At any time during its deployment, the monitoring device may detect an event at a following stage (306). As has also already been mentioned the event may include, amongst others, the monitored condition exceeding the condition threshold (312), receiving an instruction from the network manager to transmit sensor module data to the network manager (308), or receiving an instruction from the IoT platform to transmit sensor module data to the IoT platform (310). If no event is detected the monitoring device simply continues monitoring the condition.

In response to detecting an event, the monitoring device may determine at a next stage (314) whether a peer-to-peer ad hoc network including the monitoring device has already been established.

For example, as the monitoring device is transported from one location to another, it may enter the range of an already established peer-to-peer ad hoc network or a network manager. If the monitoring device is within range of a peer-to-peer ad hoc network but not already part of such a network, the monitoring device may dynamically join the peer-to-peer ad hoc network or dynamically establish a peer-to-peer ad hoc network with other monitoring devices, as the case may be, at a following stage (316). In some cases, in response to joining or establishing a peer-to-peer ad hoc network, the monitoring device may receive, at a next stage (317), sensor module data from an upstream monitoring device.

If the monitoring device is already associated with a peer-to-peer ad hoc network, or once the monitoring device has joined or established a peer-to-peer ad hoc network, the monitoring device determines, at a following stage (318), an optimal data path to the network manager. In some embodiments, the optimal data path may have already been determined at the time of detecting the event.

In some cases, the method (300) may include a stage (320) of the monitoring device determining whether a data transmit permission indication has been received from the local network manager. The data transmit permission indication may be received with other network manager data transmitted from the local network manager. The monitoring device may, for example, be configured to only send sensor module data to the local network manager when the local network manager has authorized it to do so, for example by transmitting a data transmit permission indication. Where no data transmit permission indication has been received, the monitoring device may be prevented from transmitting sensor module data.

If a data transmit permission has been received, the monitoring device then transmits, at a following stage (321), sensor module data to the network manager via the optimal data path for onward transmission to the IoT platform, after which it resumes its monitoring state at the initial stage (302).

Thus, in some cases, by default, the monitoring device does not transmit data. Only once the monitoring device receives a data transmit permission indication and other configurations from a network manager will the monitoring device transmit the sensor module data. If a network manager is installed inside an aircraft (or any other location where transmitting is forbidden), then the network manager can instruct all monitoring devices to withhold data transmissions by withholding the data transmit permission indication until. During this "waiting" period, the monitoring device may periodically receive updating messages (network synchronization etc.) from the network manager, but will not transmit sensor module data. It is also anticipated that, instead of a data transmit permission indication, the local network manager transmits a data transmit prohibit indication prohibiting the monitoring device from transmitting data.

FIG. 3B is a flow diagram which illustrates additional steps of the method (300) described above with reference to FIG. 3A. The additional steps of the method (300) are conducted at the monitoring device.

Embodiments of the disclosure also provide that at any stage, the monitoring device may receive, at an initial stage (328), input from a user. The input received from the user may be an instruction to display sensor module data. In response to receiving such an instruction, the monitoring device is configured to prompt the user at a following stage (330) to connect the monitoring device to an external power source prior to outputting sensor module data. At a next stage (332), the monitoring device may output sensor module data to the user via an output component.

Now referring to FIG. 3C, which is a flow diagram which illustrates another exemplary method (340) for monitoring a condition to which an object, typically in transit, is exposed. The method (340) is conducted at a monitoring device and may be conducted together with the method (300) described above with reference to FIG. 3A.

The method (340) includes a stage (342) of receiving sensor module data from a sensor module of the monitoring device. The sensor module data is produced or output by a sensor module of the monitoring device and relates to one or more conditions monitored by the sensor module. In some cases, some of the sensor module data may be raw and may require processing. Thus, the method may further include a stage of processing the received sensor module data to produce processed sensor module data.

At a next stage (344), network manager data may be received from a local network manager. The network manager data received may include a data transmit permission indication; a network identifier; a network manager type; clock synchronization data; wireless frequency channel data; geographical location data of the local network manager and the like. The network manager data may further include magnetometer, angular rate and gravitational (MARG) sensor data of the local network manager. Receiving network manager data from the local network manager may include receiving network manager data from a plurality of local network managers being within range of the monitoring device.

The received network manager data is then compared with the sensor module data at a next stage (346). Comparing the network manager data with the sensor module data may compare magnetometer, angular rate and gravitational (MARG) sensor data included in the network manager data and sensor module data respectively.

If (348) the network manager data approximates the sensor module data, an association with the local network manager is established at a following stage (350). Establishing an association with a local network manager may include recording the local network manager as being an associated local network manager. In some cases, an association flag may be set so as to indicate that the network manager data of the associated local network manager approximates the sensor module data. In another embodiment, an association file may be updated so as to record the local network manager as being an associated local network manager, the file for example including a network identifier of the associated local network manager.

Matching network manager data and sensor module data may indicate that the monitoring device and local network manager are moving in unison, for example, that the monitoring device is in the same truck or aircraft as the local network manager. Associating the monitoring device with the local network manager may include a stage of the monitoring device dynamically joining a peer-to-peer ad hoc network of the local network manager. Should the sensor module data not match network manager data of any local network manager within range, an association will not be formed. However, the monitoring device can nevertheless still form a peer-to-peer ad hoc network with any other network manager that is within wireless range, but without the association condition.

The method may include a stage (352) of, while the monitoring device is associated with the local network manager, receiving geographical location data from the local network manager. The geographical location data may be received from a geographical location monitoring component of the local monitoring device, such as a GPS receiver or the like.

During its association with a local network manager, the monitoring device continually compares its sensor module data with the network manager data of the local network manager. If (348) at some stage it is determined that the network manager data no longer approximates the sensor module data, the method includes a step (354) of dissolving the association with the local network manager. At a following stage (356), responsive dissolving the association, a geographical location of the monitoring device may be incrementally estimated using the geographical location data received from the local network manager as well as magnetometer, angular rate and gravitational (MARG) sensor data produced by a magnetometer, an angular rate sensor and a gravitational sensor of the sensor module. Estimating the geographical location of the monitoring device may use known inertial navigation techniques, using, for example, the geographical location data received from the local network manager immediately prior to the association being dissolved as an initial set-point. Such techniques may enable the monitoring device to navigate indoors, where conventional GPS receivers and the like are not able to operate. Such techniques may further provide advantages in the form of energy efficiency by obviating the need for a GPS receiver on the monitoring device.

The method may determine from the MARG sensor data that the monitoring device is stationary (358) and, if so, the estimated geographical location of the monitoring device may be stored in a non-volatile memory of the monitoring device at a next stage (360). In some cases, this may include transmitting the estimated geographical location to a local network manager as well. This stored estimate may then be used as an initial set-point for further geographical location estimation should the monitoring device move again.

Figure 4:
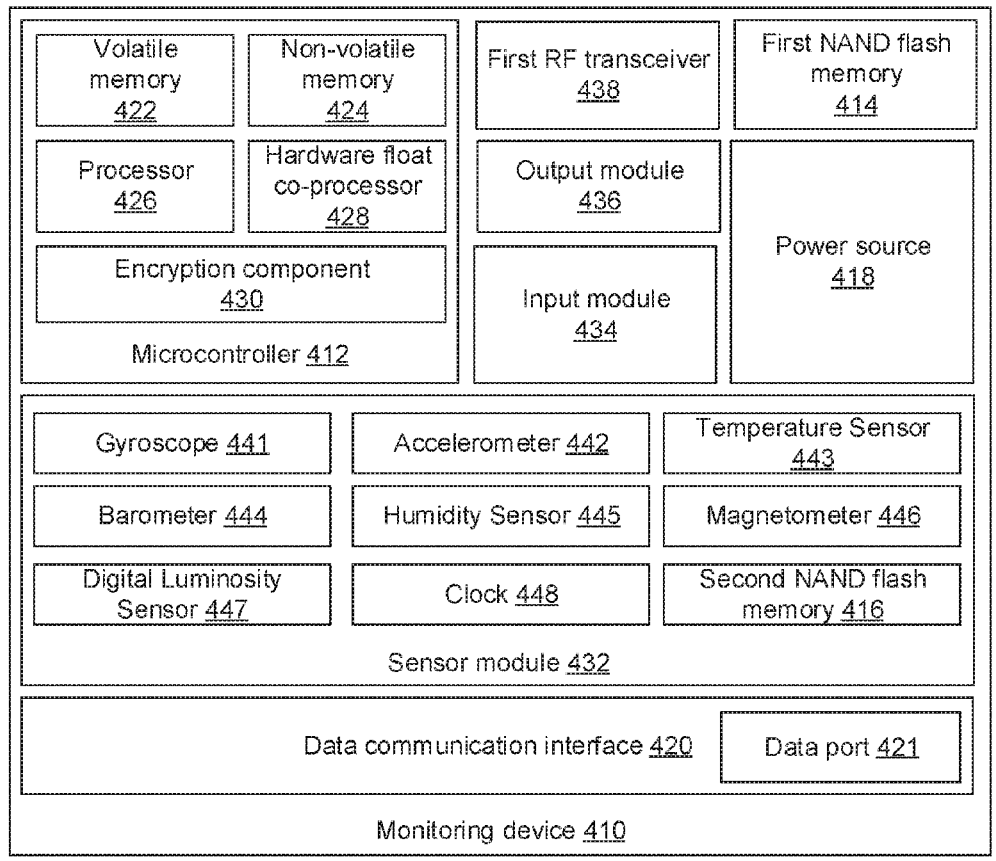
FIG. 4 is a block diagram which illustrates a monitoring device according to embodiments of the disclosure.

FIG. 4 is a block diagram which illustrates one embodiment of an exemplary monitoring device (410). The monitoring device is similar to the monitoring device described above with reference to FIG. 2 and interfaces, components and modules of each of these monitoring devices may be included or interchanged as may be appropriate.

The monitoring device (410) includes a microcontroller (412), a first separate NAND flash memory (414) a second separate NAND Flash memory (416), a power source (418) and a data communication interface (420) providing a data port (421).

In one particular embodiment, the microcontroller (412) may be an ARM 32-bit Cortex M7 CPU having 1 Mbytes of Flash memory and 320 Kbytes of SRAM memory, although any other appropriate microcontroller, microprocessor or other arrangement of circuitry may be used. The microcontroller (412) may include direct memory access (DMA) controllers and a 96-bit unique identifier (ID). The microcontroller may include: a volatile memory (422) and a non-volatile memory (424); a processor (426); a hardware float co-processor (428); and, an encryption component (430) providing 256-bit AES encryption, safe-key storage for encryption and anti-tamper encryption key protection. The microcontroller (412) also provides various communication busses (such as, for example universal serial bus (USB), inter-integrated circuit (I2C), serial peripheral interface (SPI), and RS-232) via which the microcontroller (412) may communicate with one or both of other modules or interfaces of the monitoring device (410) and devices external to the monitoring device (410).

The non-volatile memory (424) of the microcontroller (412) is used for storing firmware executable and read only data on the microcontroller (412) and the volatile memory (422) of the microcontroller (412) is used for storing temporary data.

The first separate NAND flash memory (414) provides the digital memory and is used for storing one or more configurable parameters. The second NAND flash memory (416) stores sensor module data. The NAND flash memory may also store the resultant calculations of various MARG conditions such as magnetometer, accelerometer, gravity and temperature data that determines the geographical location of the device.

The one or both of the first and second NAND flash memory may be removable, for example in the form of a Secure Digital™ (SD) or other removable memory card. The capacity of the NAND flash memory may be sufficiently large enough to store a minimum of 6 months of sensor module and processed sensor module data. The sensor module data and other data may be stored in a B-tree format and may be fully encrypted.

In the present embodiment the power source (418) is a battery but it will be appreciated that it could include any one or more of a battery, solar panels or cells, kinetic energy harvesting components and a power controller. A power management component may also be provided to regulate the power.

The monitoring device (410) includes an input module (434) for receiving input from a user. In a preferred embodiment, the input module includes a number of buttons while in other embodiments the input module may be a keyboard, touch-sensitive display, microphone, which may selectively recording sounds, or any other appropriate input module. The monitoring device (412) further includes an output module (436) for outputting data to the user. The output module (436) may include one or more of the group of: display screen; a buzzer component for sounding an alert or status change; and light emitting diodes (LED's) for signalling status conditions, such as battery condition, transmit/receive conditions and heartbeat.

The monitoring device includes a first RF transceiver (438) for transmitting sensor module data to a network manager. The first RF transceiver (438) of the illustrated embodiment is a wireless radio configured for low-rate wireless local area networking which makes use the Institute of the IEEE 802.15.4 communication standard. The carrier frequency utilized by the first RF transceiver (438) is within the 2.4 to 2.5 GHz ISM band. The first RF transceiver (438) may also be configured for receiving sensor module data from one or more upstream monitoring devices and for receiving a geographical location data from a local network manager.

The detecting component of the monitoring device (410) according to embodiments of the disclosure may be provided by software or firmware executable on the microcontroller (412). For example, the microcontroller (412) may be configured to detect an event such as, for example, the monitored condition exceeding the condition threshold, receiving an instruction from the network manager to transmit sensor module data to the network manager and receiving an instruction from the IoT platform to transmit sensor module data to the IoT platform.

The determining component of the monitoring device (410) for determining an optimal data path to the local network manager may be provided by the software or firmware executing on the microcontroller (412). Alternatively, the determining component may be provided by the first RF transceiver (438).

The monitoring device (412) includes a sensor module (432). The sensor module (432) may include a plurality of sensors including one or more of a gyroscope (441), an accelerometer (442), a temperature sensor (443), a barometer (444), a humidity sensor (445), a magnetometer (446), a digital luminosity sensor (447), and a clock (448). The sensors may be disposed in the monitoring device (412) or may be provided by an external sensor probe. In some embodiments of the disclosure, the external sensor probe may provide some sensors while the other sensors are disposed in the monitoring device (412). Furthermore, the sensor module (432) may include the second NAND flash memory (416) which stores sensor module data received from the sensors.

In some embodiments, the external sensor probe has one or more micro-electromechanical systems (MEMS) sensors configured to sense one or more conditions (or parameters) and an I2C communication bus in electrical communication therewith. The one or more sensors and I2C communication bus are disposed on a substrate. The sensor probe includes a digital storage module in which a unique probe identifier is stored and which is in electrical communication with the communication bus. The probe includes, a cable, a first end of which is in electrical communication with the communication bus and a second end of which is in electrical communication with the monitoring device (410). The cable is configured to provide electrical power received from the monitoring device (410) to the one or more sensors, via the I2C communication bus, and to communicate data received from the one or more sensors, via the communication bus, to the remote monitoring unit. Such a sensor probe is disclosed in applicants' co-pending U.S. patent application Ser. No. 14/095,436, which is incorporated herein by reference.

The monitoring device (410) further includes a data communication interface (420). The data communication interface (420) may include a controller module, a switching module and a data port (421). The controller module is operable to monitor a status of a power line of the data port and, if the power line has a first status, to transmit a first communication mode instruction to the switching module. If the power line has a second status, the controller module is configured to transmit a second communication mode instruction to the switching module. The switching module is configured to receive a communication mode instruction from the controller module and, if the first communication mode instruction is received, to route data communication lines corresponding to a first communication protocol to the data port. If the second communication mode instruction is received, the switching module is configured to route data communication lines corresponding to a second communication protocol to the data port. Such a data communication interface is disclosed in applicant's co-pending U.S. patent application Ser. No. 14/095,417, which is incorporated herein by reference.

Embodiments of the disclosure provide for the monitoring device (410) to be permanently activated (i.e. permanently on). For example, the monitoring device (410) may be provided without an ON/OFF switch. The monitoring device (410) may include micro-electro-mechanical (MEMS) sensors on-board or external to the monitoring device (e.g. provided by sensor probes). The sensors can be configured via the IoT platform, for example, to set threshold limits of any sensor and to monitor and log the status of each sensor on a continuous, per second basis, or any other interval of the user's choosing. The monitoring device can also receive over-the-air communications from the IoT platform, via the local network manager for software code updates and the like.

Should the status of any of the sensors exceed the configured threshold limits defined by the configurable parameter, a detailed exception alert message can be transmitted back to the IoT platform via a network manager. The IoT platform can then forward these exception alerts by email or SMS to selected users. After a predefined duration, or at the end of a shipment, either the user or a selected client is able to access the sensor module data that the monitoring device (410) logged and recorded, and a certificate of conformity (i.e. certifying that all sensor data was within the selected threshold limits) can be output from the IoT platform.

In some embodiments of the disclosure, the monitoring device (410) uses 256-bit AES encryption to encrypt all recorded and stored sensor module data. The data remains encrypted throughout its transmission from the monitoring device to the IoT platform.

In some embodiments of the disclosure, the monitoring device (410) may operate in areas where there is no local network manager. In such cases, the monitoring device (410) may be plugged into any computing device (for example, a laptop, desktop or the like) and, in response, the monitoring device (410) is configured to operate as a network manager through which other monitoring devices are able to communicate. Similarly, the monitoring device may be interrogated by a secondary device via short-range wireless communication link, such as Bluetooth. Such functionality may enable the monitoring device to act as a stand-alone data logger.

Figure 5:
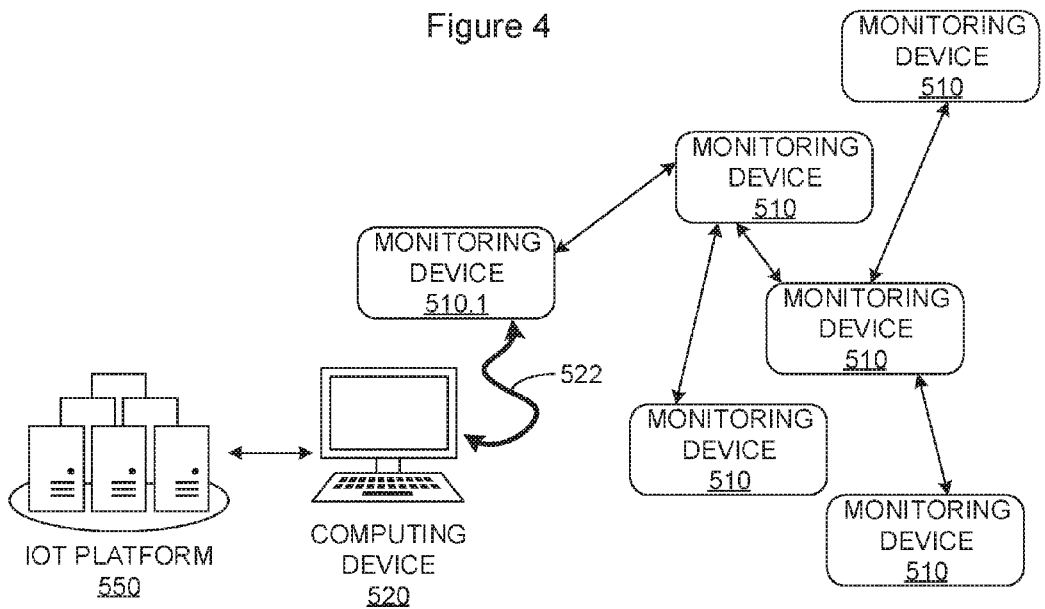
FIG. 5 is a schematic diagram which illustrates a monitoring device according to embodiments of the disclosure which is connected to a computing device.

FIG. 5 is a schematic diagram which illustrates a monitoring device (510.1) being connected to a computing device (520) and operating as a network manager through which other monitoring devices (510) are able to communicate. The monitoring device (510.1) may be connected to the computing device (520) via a cable (522) connected between a data communication interface of the monitoring device (510.1) and, for example, a universal serial bus (USB) port of the computing device (520). When connected to the computing device (520), the monitoring device (510.1) may be configured to perform at least some of the functionality of a network manager according to embodiments of the disclosure. The monitoring device (510.1) may use a communication component of the computing device (520), providing, for example a Wi-Fi, Ethernet or Internet connection, to communicate with the IoT platform (550) such that sensor module data of the monitoring device (510.1) and of the other upstream monitoring devices (510) may be transmitted to the IoT platform (550).

In one exemplary use case of a monitoring device (110, 410, 510), the monitoring device (110, 410, 510) may not be within range of a peer-to-peer ad hoc network during the monitoring operation (for example during the transit of the monitoring device from source to destination). The monitoring device (110, 410, 510) may accordingly be configured to continue to monitor one or more conditions until a user is able to manually access the recorded data off the monitoring device (110, 410, 510). In such a situation, the monitoring device (110, 410, 510) functions as a data logger. All conditions such as environmental data monitored on by the monitoring device (110, 410, 510) may be constantly logged and recorded on, for example a second-by-second basis, and will have to be retrieved using input and output modules of the monitoring device (110, 410, 510). As the monitoring device (110, 410, 510) is regularly monitoring one or more conditions, the monitoring device (110, 410, 510) is capable of sensing if it has been dropped and by what distance, and, with the data from the gyroscope and compass, the device will be able to calculate its location in a building when there is no geographical position.

In another exemplary use case, where, for example, there are no wireless peer-to-peer ad hoc networks throughout the transit route except for network managers at the place of shipment and the final destination, the monitoring device (110, 410, 510) may operate in a second configuration mode. In the second configuration mode, the user may be able to manually retrieve sensor module data using the input and output modules of the monitoring device (110, 410, 510) or over a short-range communication link using a secondary device. Additionally, the user may be able to retrieve the sensor module data from an IoT platform once the monitoring device reaches the final destination (e.g. when the monitoring device is within range of a network manager). Printable audit-trails of sensor module data (for example on a continuous, second-by-second basis for the entire transit) can be obtained from the IoT platform. Only if, or when there is a peer-to-peer network, will geographical location data be available to the monitoring device, however the entire transit may be logged on, for example, a second-by-second time and date basis.

In a third exemplary use case of a monitoring device (110, 410, 510), comprehensive peer-to-peer ad hoc networks and network managers may be provided for almost all of the transit route, including fixed networks at the shipper's and receiver's premises, and mobile networks that can be attached to delivery trucks, railroads, aircraft, ships etc., and whereby the user is able to access and retrieve sensor module data from the IoT platform throughout the entire transit period. Geographical locational information may be obtained from any fixed or mobile network managers that are associated with the monitoring device (110, 410, 510), and whenever an event is detected, an alert may be transmitted to the IoT platform which may then transmit an SMS or email to the user to advise the user of the event.

Figure 6:
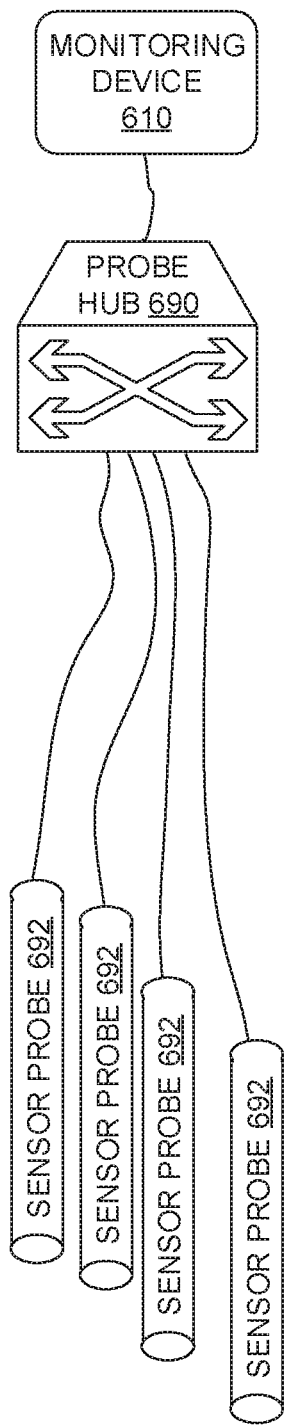
FIG. 6 is a schematic diagram which illustrates a monitoring device according to embodiments of the disclosure which has a probe hub and a plurality of sensor probes connected thereto.

In yet another exemplary use case, the monitoring device (110, 410, 510) may be provided with one or more sensor probes, and possibly one or more probe hubs. FIG. 6 is a schematic diagram which illustrates a monitoring device (610) having a probe hub (690) connected thereto. The probe hub (690) has a plurality of sensor probes (692) connected thereto. Each of the plurality of sensor probes (692) may be individually configured via the IoT platform and may be placed into, affixed onto or otherwise associated with an object. Each sensor probe (692) may have a unique identifier. The configuration illustrated in FIG. 6 may be advantageous as multiple objects may be monitored using only one monitoring device (610) and a plurality of sensor probes (692).

External sensor probes (692) (which may also be referred to as "slave" monitoring devices) may be used in applications where the monitoring device (610) cannot, for example, be included inside a package, especially when extreme cold conditions exist and where batteries of the monitoring device (610) may not be able to function efficiently. An exemplary sensor probe (692) may be able to measure temperature, barometric pressure, humidity, light and the like and is disclosed, along with a probe hub (690) in Applicants' previously mentioned co-pending U.S. patent application Ser. No. 14/095,436.

In yet another exemplary use case, the monitoring device (110, 410, 510, 610) may additionally include a communication component and a geographical location receiving component. The communication component may be similar to that of the network manager and of the IoT platform and may enable the monitoring device (110, 410, 510, 610) to establish a wired or wireless communication link with the IoT platform without utilising a network manager. In such an exemplary use case, the monitoring device (110, 410, 510, 610) may accordingly be operable to function as a network manager to other monitoring devices and may be configured to establish a peer-to-peer ad hoc network with other monitoring devices. The monitoring device (110, 410, 510, 610) may transmit geographical locational information to other monitoring devices in the peer-to-peer ad hoc network and may receive sensor module data from the other monitoring devices. Furthermore, the monitoring device (110, 410, 510, 610) may be configured to select a suitable communication link over which to transmit sensor module data to the IoT platform or to a network manager.

In another exemplary use case, the monitoring device (110, 410, 510, 610) may be provided with a wireless monitor which may be physically connected to the monitoring device (110, 410, 510, 610). The wireless monitor may be connected to the monitoring device via a RS-232 communication link. The monitoring device (110, 410, 510, 610) may include a communication component and a geographical locational receiving component and may communicate with other monitoring devices via the wireless monitor.

A highly scalable and redundant monitoring system is described herein which may include a number of monitoring devices, a number of network managers a number of repeater devices and a remotely accessible IoT platform. The monitoring devices described herein boast significant advantages in terms of reduced energy consumption and lower operating costs, particularly insofar as communication via cellular or satellite communication networks is concerned. The monitoring devices, together with the data communication interface and sensor probes provide enhanced scalability and versatility.

Figure 7:
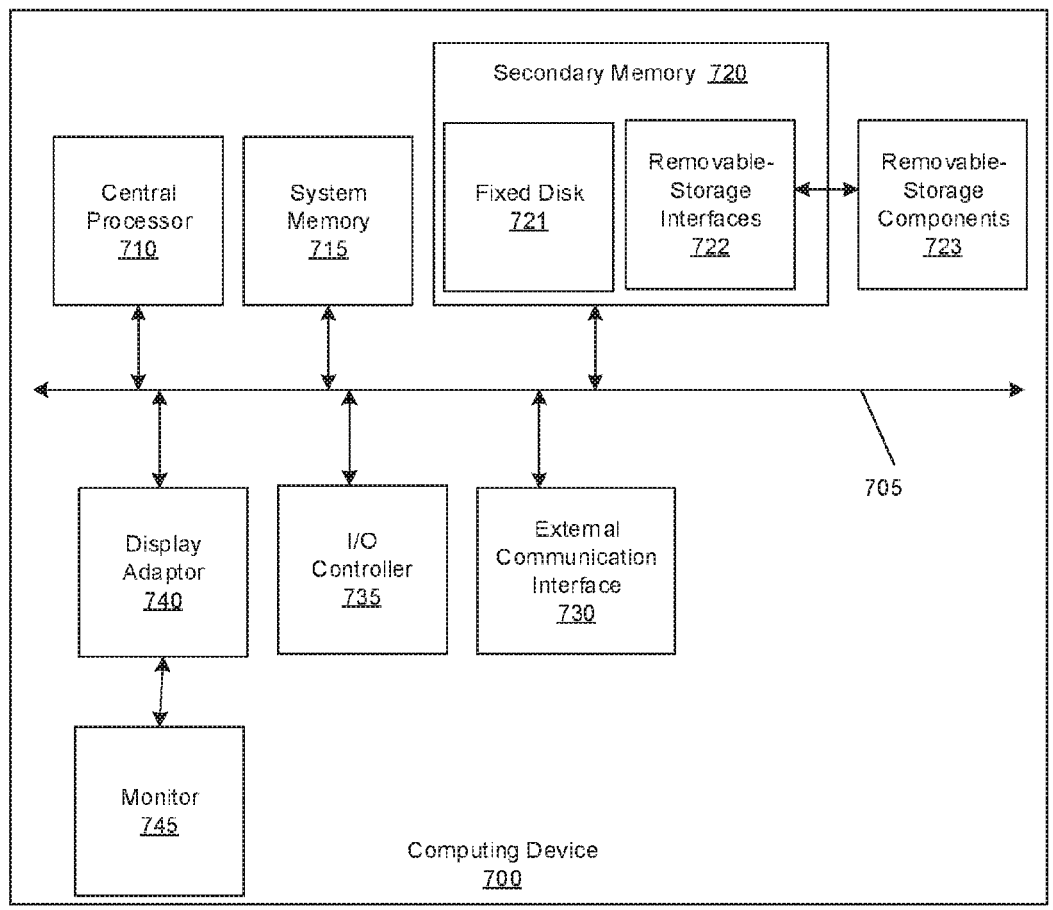
FIG. 7 is a block diagram which illustrates an exemplary computing device in which various aspects of the disclosure may be implemented.

FIG. 7 illustrates an example of a computing device (700) in which various aspects of the disclosure, such as the IoT platform for example, may be implemented. The computing device (700) may be suitable for storing and executing computer program code. The various participants and elements in the previously described system diagrams may use any suitable number of subsystems or components of the computing device (700) to facilitate the functions described herein.

The computing device (700) may include subsystems or components interconnected via a communication infrastructure (705) (for example, a communications bus, a cross-over bar device, or a network). The computing device (700) may include at least one central processor (710) and at least one memory component in the form of computer-readable media.

The memory components may include system memory (715), which may include read only memory (ROM) and random access memory (RAM). A basic input/output system (BIOS) may be stored in ROM. System software may be stored in the system memory (715) including operating system software.

The memory components may also include secondary memory (720). The secondary memory (720) may include a fixed disk (721), such as a hard disk drive, and, optionally, one or more removable-storage interfaces (722) for removable-storage components (723).

The removable-storage interfaces (722) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (722) may also be in the form of ports or sockets for interfacing with other forms of removable-storage components (723) such as a flash memory drive, external hard drive, or removable memory chip, etc.

The computing device (700) may include an external communications interface (730) for operation of the computing device (700) in a networked environment enabling transfer of data between multiple computing devices (700). Data transferred via the external communications interface (730) may be in the form of signals, which may be electronic, electromagnetic, optical, radio, or other types of signal.

The external communications interface (730) may enable communication of data between the computing device (700) and other computing devices including platforms and external storage facilities. Web services may be accessible by the computing device (700) via the communications interface (730).

The external communications interface (730) may also enable other forms of communication to and from the computing device (700) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (710).

A computer program product may be provided by a non-transient computer-readable medium, or may be provided via a signal or other transient means via the communications interface (730).

Interconnection via the communication infrastructure (705) allows a central processor (710) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (700) either directly or via an I/O controller (735). These components may be connected to the computing device (700) by any number of means known in the art, such as a serial port.

One or more monitors (745) may be coupled via a display or video adapter (740) to the computing device (700).

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A mobile monitoring device for monitoring a condition to which an object is exposed as it moves between multiple wireless local area networks, each of which at least including one or more mobile or fixed network managers, wherein the monitoring device is configured to dynamically join a network with a network manager which is local to the monitoring device, the mobile monitoring device comprising:
   a sensor module for producing sensor module data including inertial navigation data;
   a first transceiver component for receiving network manager data from the local network manager, the network manager data including inertial navigation data of the local network manager;
   an associator component for establishing an association with the local network manager when the inertial navigation data of the sensor module approximates the inertial navigation data of the local network manager and dissolving the association with the local network manager when the inertial navigation data of the sensor module does not approximate the inertial navigation data of the local network manager; and,
   an inertial navigation component for incrementally estimating a geographical location of the monitoring device using geographical location data of the local network manager received immediately prior to the association being dissolved and subsequent inertial navigation data produced by the sensor module of the monitoring device.

2. The monitoring device as claimed in claim 1, wherein the associator component compares the inertial navigation data of the sensor module with the inertial navigation data of the local network manager.

3. The monitoring device as claimed in claim 1, wherein geographical location data of the local network manager is included in the network manager data while the association is established.

4. The monitoring device as claimed in claim 1, wherein the inertial navigation component incrementally estimates the geographical location of the monitoring device responsive to the associator component dissolving the association.

5. The monitoring device as claimed in claim 1, wherein the inertial navigation component uses the geographical location data of the local network manager received immediately prior to the association being dissolved as an initial set-point.

6. The monitoring device as claimed in claim 1, wherein establishing the association indicates that the monitoring device and local network manager have moved in unison and are on a common platform.

7. The monitoring device as claimed in claim 1, wherein the monitoring device is configured to remain in the network of the local associated network manager after dissolving the association whilst it is within wireless range.

8. The monitoring device as claimed in claim 1, wherein the first transceiver component is configured to receive network manager data from the local network manager via the network, wherein the first transceiver component is configured to transmit sensor module data to the local network manager via the network, and wherein the sensor module data includes the geographical location of the local network manager.

9. The monitoring device as claimed in claim 8, wherein the sensor module data includes the estimated geographical location after the association has been dissolved.

10. The monitoring device as claimed in claim 8, wherein the monitoring device is configured to transmit sensor module data to the local network manager during and after dissolving the association.

11. The monitoring device as claimed in claim 10, wherein the monitoring device includes a power source and wherein the sensor module is permanently activated for continual monitoring of the condition.

12. The monitoring device as claimed in claim 11, wherein the sensor module data is accessible for remote monitoring by a server computer via the local network manager.

13. The monitoring device as claimed in claim 1, wherein the monitoring device is a portable handheld monitoring device.

14. The monitoring device as claimed in claim 1, wherein the inertial navigation data includes magnetometer, angular rate, gravitational and acceleration sensor data.

15. The monitoring device as claimed in claim 1, including a communication component for establishing a wired or wireless communication link with a server computer, and wherein the monitoring device is configured to function as a network manager to other monitoring devices.

16. The monitoring device as claimed in claim 1, including a secondary transceiver component for transmitting sensor module data to a secondary device via a short-range communication link.

17. The monitoring device as claimed in claim 1, wherein the monitoring device is configured to receive user input from a user via a short-range communication link or a keypad, and wherein the monitoring device is configured to output sensor module data to the user via the short-range communication link or a display screen.

18. The monitoring device as claimed in claim 17, wherein the user input includes an instruction to output sensor module data, and wherein the sensor module data is output to the user via the short-range communication link or the display screen in response to receiving the instruction.

19. A system for monitoring a condition to which an object is exposed, the system comprising a plurality of monitoring devices as claimed in claim 1, and a plurality of networks, wherein each one of the networks includes one or more network managers, each network manager including a first transceiver component for transmitting network manager data to the monitoring devices, and wherein each monitoring device is operable to dynamically join or establish a network with a network manager, being local to the monitoring device, as it moves from one local network to another.

20. A method for monitoring a condition to which an object is exposed, the method being conducted by a mobile monitoring device having a sensor module which monitors the condition as the monitoring device moves between multiple wireless local area networks, each of which at least including one or more mobile or fixed network managers, wherein the monitoring device is configured to dynamically join a network with a network manager which is local to the monitoring device, the method comprising:
   receiving sensor module data including inertial navigation data from the sensor module;
   receiving network manager data from the local network manager, the network manager data including inertial navigation data of the local network manager;
   establishing an association with the local network manager when the inertial navigation data of the sensor module approximates the inertial navigation data of the local network manager and dissolving the association with the local network manager when the inertial navigation data of the sensor module does not approximate the inertial navigation data of the local network manager; and,
   incrementally estimating a geographical location of the monitoring device using geographical location data of the local network manager received immediately prior to the association being dissolved and subsequent inertial navigation data produced by the sensor module of the monitoring device.

* * * * *